W. E. BELLINGHAM.
AUTOMOBILE WINDSHIELD ACCESSORY.
APPLICATION FILED JAN. 6, 1922.
1,432,149.
Patented Oct. 17, 1922.
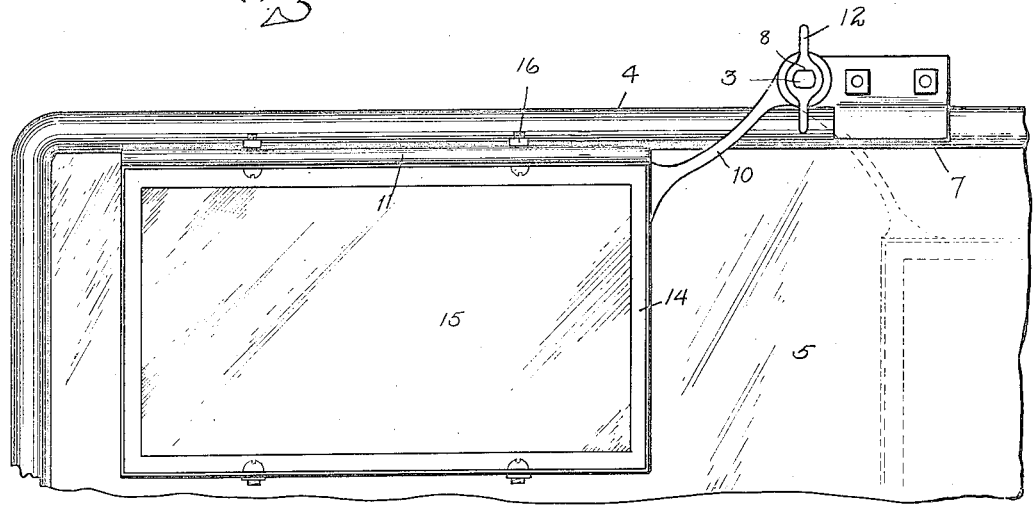
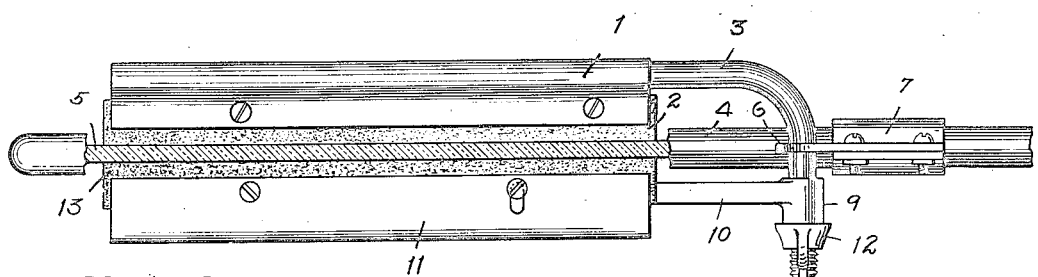
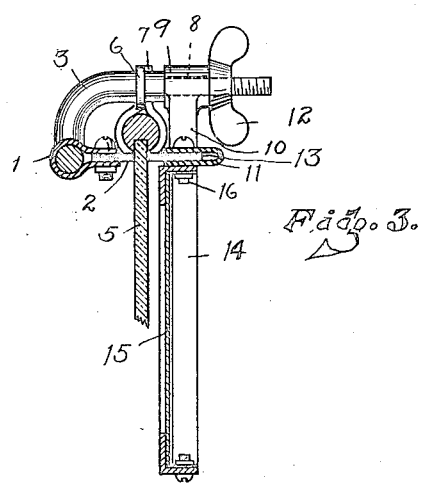
Inventor
Wm E. Bellingham
Geo. Stevens
Attorney Patented Oct. 17, 1922.

1,432,149

UNITED STATES PATENT OFFICE.

WILLIAM E. BELLINGHAM, OF DULUTH, MINNESOTA.

AUTOMOBILE WINDSHIELD ACCESSORY.

Application filed January 6, 1922. Serial No. 527,308.

*To all whom it may concern:*

Be it known that I, WILLIAM E. BELLINGHAM, a citizen of the United States, residing at Duluth, in the county of St. Louis and State of Minnesota, have invented certain new and useful Improvements in Automobile Windshield Accessories, of which the following is a specification, reference being had therein to the accompanying drawing.
This invention relates to automobile wind shield accessories and has special reference to a combination cleaner and vision shield.

The principal object is to produce a convenient and practical combination device of this character.

Other objects and advantages of the invention will appear in the further description thereof.

Referring to the acompanying drawing illustrating one embodiment of the invention and in which like reference characters indicate like parts:

Figure 1 is a fragmental portion of the wind shield of an automobile showing an inside elevation of one of the combination devices attached thereto;

Figure 2 is a top plan view of Figure 1 showing the glass of the wind shield in section; and Figure 3 is a transverse sectional view on the line 3—3, Figure 2.

The cleaner portion of the device comprises an inner and an outer cooperatively united squeegee member, the latter comprising a clamping member 1, holding the rubber glass engaging portion 2 and supported upon the bent rod 3, the latter being so bent at right angles and upwardly as to project inwardly above the uppermost frame portion 4 of the wind shield 5. The rod 3 is mounted directly above the wind shield frame 4 in the protruding end 6 of the two-part clamping member 7 which is removably attached to the frame 4 of the shield, and which member is common to such devices.

The extreme innermost end of the rod 3 is flattened upon opposite sides, as illustrated at 8, said flattened portion extending some distance inwardly from the end thereof forming shoulders against which the hub portion 9 of the supporting arm 10 of the innermost squeegee member 11 is engaged when slipped onto the end of the rod 3 and against which it is securely held by the suitable wing nut, indicated at 12.

The flattened portions of the rod 3 are of such an extent longitudinally thereof as to normally bring the two squeegee members in proper alignment with their respective faces of the glass, and the rubber portions 2 and 13 of the squeegee members are preferably made adjustable within their clamping or holding members by the bolt holes in the latter being made elongated so that the rubbers may be set in proper alignment with the glass, as is obvious.

The arm 10 is directly attached to the frame 14 which carries in any convenient manner the vision shield glass 15 and upon the upper horizontal side of the frame 14 is attached as by suitable bolts 16 the clamping member 11, previously referred to. By this means we have suspended from beneath the innermost squeegee a vision shield, it being understood that the glass 15 may be of any desired tint or color to protect the driver's eyes against any objectionable glare of light which he may be heading towards, and while the device is illustrated in the accompanying drawing as being placed in its extreme left hand position it is to be understood that when the benefits of the vision shield is desired the same may be swung downwardly into a vertical position as indicated in dotted lines Figure 1 when the glass will be in a position convenient for the driver to look through, and at a time when the cleaner only is employed the glass attached thereto will form no obstruction whatever to same.

The clamping member 11 is made to extend inwardly some considerable distance from the wind shield to afford convenient means for manipulating of the device by hand.

While I have shown and referred to the vision shield as being of glass it is to be understood that substitutes therefor may be employed with equally good results.

Having thus described my invention, what I claim and desire to secure by Letters Patent, is:

1. A combined wind shield wiper and glare shield comprising a suitable support attached to the wind shield, two opposed wipers one upon either side of the wind shield, means connecting said wipers and journalled in said support, a frame depending from the innermost wiper, and a glare shield medium mounted within said frame.

2. A combined wind shield wiper and glare shield comprising a suitable holding member carried by the wind shield, an L-shaped rod pivotally mounted within said support and extending upon either side of the wind shield, one end of the rod having a portion extending parallel with the wind shield glass and carrying a wind shield wiper thereupon, the opposite end of said rod extending at right angles to the wind shield, a second wind shield wiper non-rotatably mounted upon the inwardly extending end of said rod and at all times opposite the first mentioned wiper, a glare shield rigidly fixed to said innermost wiper, the frame of said inner wiper extending inwardly of said glare shield medium to act as means whereby the device may be manually manipulated.

3. A combined wind shield wiper and glare shield comprising a suitable holding member carried by the wind shield, an L-shaped rod pivotally mounted within said support and extending upon either side of the wind shield, one end of the rod having a portion extending parallel with the wind shield glass and carrying a wind shield wiper thereupon, the opposite end of said rod extending at right angles to the wind shield, a second wind shield wiper non-rotatably mounted upon the inwardly extending end of said rod and at all times opposite the first mentioned wiper, and a glare shield rigidly fixed to said innermost wiper.

In testimony whereof I hereunto affix my signature in the presence of two witnesses.

WILLIAM E. BELLINGHAM.

Witnesses:
S. C. BRONSON,
S. GEO. STEVENS.